(12) United States Patent
Kasuya (10) Patent No.: US 10,975,754 B2
(45) Date of Patent: Apr. 13, 2021

(54) ARRANGEMENT STRUCTURE OF EXHAUST GAS SENSOR

(71) Applicant: SUZUKI MOTOR CORPORATION, Hamamatsu (JP)

(72) Inventor: Osamu Kasuya, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 17 days.

(21) Appl. No.: 16/363,591

(22) Filed: Mar. 25, 2019

(65) Prior Publication Data

US 2019/0301341 A1 Oct. 3, 2019

(30) Foreign Application Priority Data

Apr. 3, 2018 (JP) .............................. JP2018-071520

(51) Int. Cl.
- *F01N 13/00* (2010.01)
- *F01N 3/20* (2006.01)
- *F01N 13/08* (2010.01)

(52) U.S. Cl.
CPC ............ *F01N 13/008* (2013.01); *F01N 3/20* (2013.01); *F01N 13/08* (2013.01); *F01N 2570/16* (2013.01); *F01N 2610/148* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,743,867 B2* | 6/2010 | Arai | ...................... | B62K 11/04 180/219 |
| 7,818,964 B2* | 10/2010 | Muramatsu | ............. | F01N 1/003 60/324 |
| 7,882,700 B2* | 2/2011 | Yamakura | ............... | F01N 13/02 180/296 |
| 8,109,084 B2* | 2/2012 | Morita | .................... | F01N 13/08 181/249 |
| 2010/0187036 A1* | 7/2010 | Locati | ....................... | F01N 3/20 180/219 |
| 2017/0350335 A1* | 12/2017 | Muramatsu | ........... | F01N 11/007 |
| 2017/0363023 A1* | 12/2017 | Arima | ................. | F02D 41/1454 |
| 2018/0111474 A1* | 4/2018 | Yamashita | ............ | F01N 11/007 |

FOREIGN PATENT DOCUMENTS

JP 4684199 B2 2/2011

* cited by examiner

*Primary Examiner* — Binh Q Tran
(74) *Attorney, Agent, or Firm* — Stein IP, LLC (57) ABSTRACT

An arrangement structure of an exhaust gas sensor includes an exhaust pipe that extends from an engine for a vehicle to form a part of an exhaust flow path, a catalytic device that purifies exhaust gas flowing through the exhaust flow path, and a first exhaust gas sensor that detects a predetermined component in the exhaust gas. The exhaust pipe is led out from a front side of the engine to one side in a left-right direction of the engine, and extends rearward so as to be routed on a lateral side of the engine. The catalytic device is arranged in the middle of the exhaust pipe on the lateral side of the engine. The first exhaust gas sensor is arranged on the lateral side of the engine and on an upstream side or a downstream side of the catalytic device in the exhaust pipe.

13 Claims, 6 Drawing Sheets

ARRANGEMENT STRUCTURE OF EXHAUST GAS SENSOR

CROSS REFERENCE TO RELATED APPLICATIONS

This application is based on Japanese Patent Application (No. 2018-071520) filed on Apr. 3, 2018, the contents of which are incorporated herein by way of reference.

BACKGROUND

The present invention relates to an arrangement structure of an exhaust gas sensor.

For example, in an off-road type motorcycle, for the purpose of improving the output, an expansion chamber having a large-capacity expansion space formed in the middle of an exhaust passage may be provided (for example, see Japanese Patent No. 4684199). In Japanese Patent No. 4684199, the expansion chamber is arranged on a front side of the engine, and an exhaust pipe wound in a loop shape is accommodated in the expansion chamber. Further, in the expansion chamber, a catalytic converter is connected on a downstream side of the exhaust pipe.

SUMMARY

An aspect of the present invention provides an arrangement structure of an exhaust gas sensor, including:

an exhaust pipe that extends from an engine for a vehicle to form a part of an exhaust flow path;

a catalytic device that purifies exhaust gas flowing through the exhaust flow path; and a first exhaust gas sensor that detects a predetermined component in the exhaust gas, wherein the exhaust pipe is led out from a front side of the engine to one side in a left-right direction of the engine, and extends rearward so as to be routed on a lateral side of the engine, wherein the catalytic device is arranged in the middle of the exhaust pipe on the lateral side of the engine, and wherein the first exhaust gas sensor is arranged on the lateral side of the engine and on an upstream side or a downstream side of the catalytic device in the exhaust pipe.

DETAILED DESCRIPTION OF EXEMPLIFIED EMBODIMENT

There has been proposed a technique for detecting exhaust gas components by an exhaust gas sensor provided in the middle of an exhaust passage in an exhaust system of a vehicle. Particularly, with recent exhaust gas regulation, it is further required to accurately detect exhaust gas components in the exhaust system of the vehicle. However, due to the configuration of other parts of an exhaust device such as a muffler or a catalyst, the arrangement of the exhaust gas sensor is restricted, and it may be difficult to arrange the exhaust gas sensor at a position where the exhaust gas components can be appropriately detected.

The present invention is made in view of the above circumstances, and an object thereof is to provide an arrangement structure of an exhaust gas sensor capable of arranging the exhaust gas sensor without impairing detection accuracy of exhaust gas components.

Figure 4:
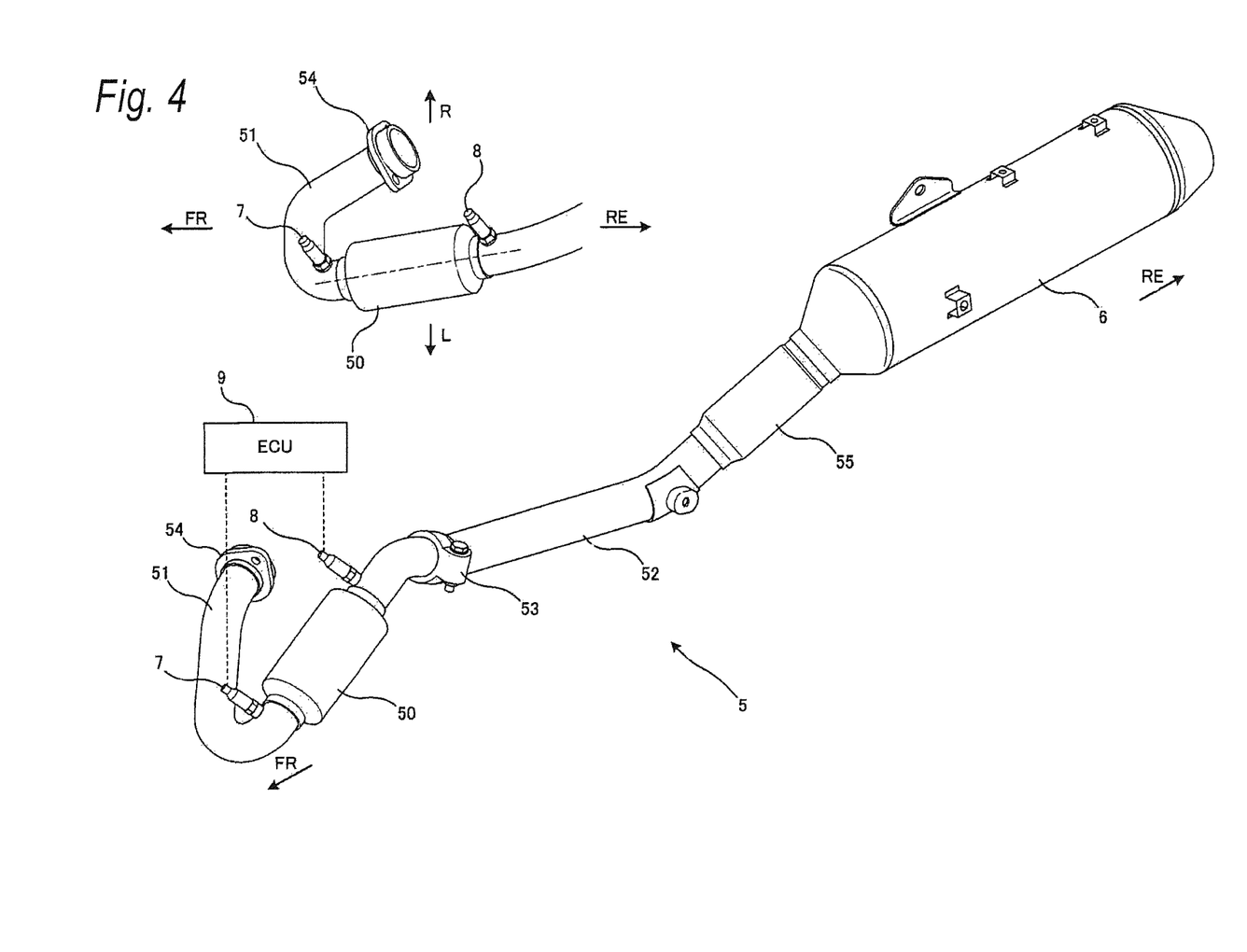
FIG. 4 is a perspective view and a partial top view of an exhaust pipe according to the present embodiment.

Hereinafter, an embodiment of the present invention is described in detail with reference to the accompanying drawings. Hereinafter, an example in which the present invention is applied to an off-road type motorcycle is described, but the application subject is not limited thereto and modifications may be made. For example, the present invention may be applied to other types of vehicles. In terms of direction, an arrow FR indicates a vehicle front side, an arrow RE indicates a vehicle rear side, an arrow UP indicates a vehicle upper side, an arrow LO indicates a vehicle lower side, an arrow L indicates a vehicle left side, and an arrow R indicates a vehicle right side respectively. In the embodiment, as shown in FIG. 4, the vehicle left side corresponds to an outside of the engine, and the vehicle right side corresponds to an inside of the engine. In the following drawings, a part of the configuration is omitted for convenience of description.

Figure 1:
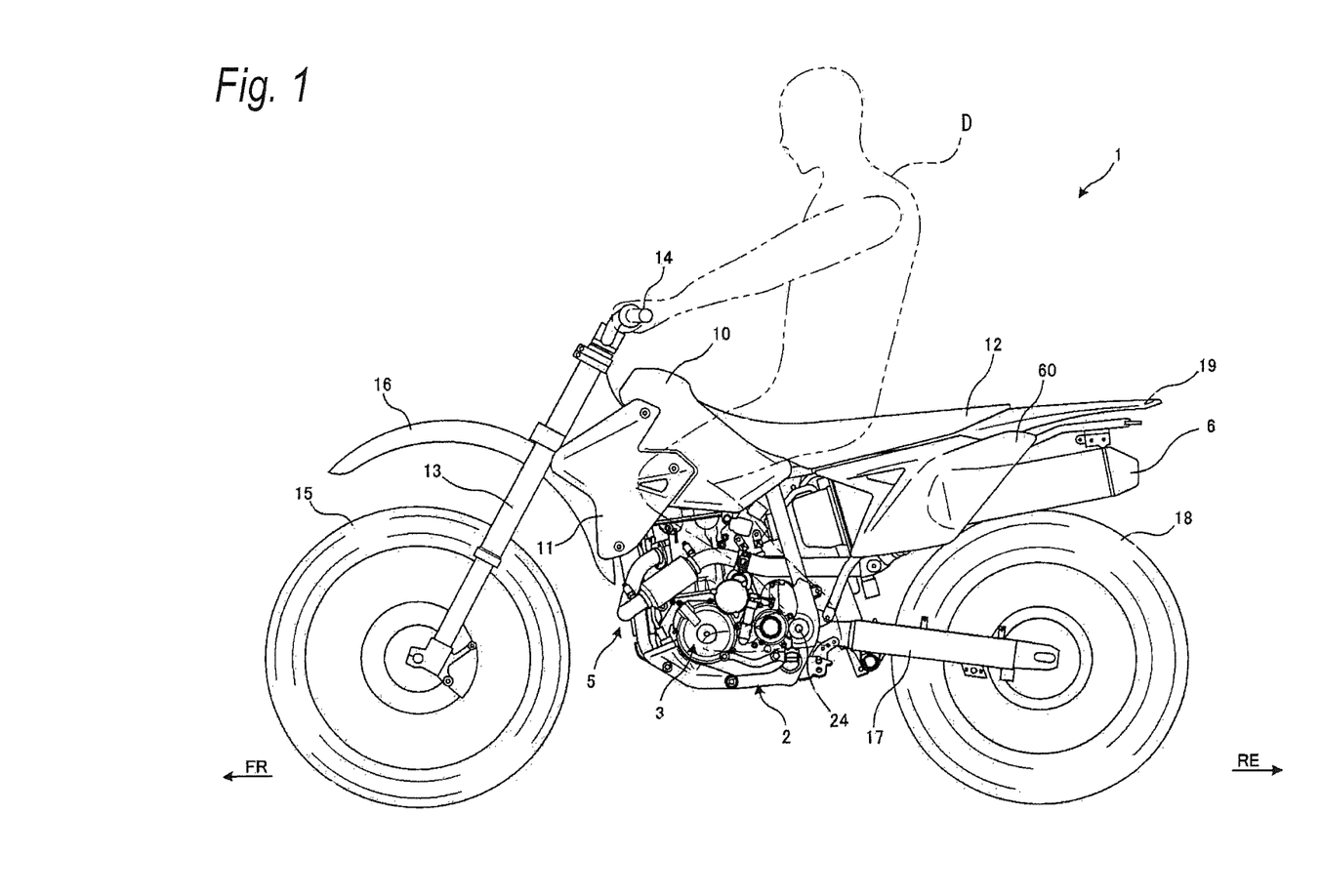
FIG. 1 is a left side view illustrating a schematic configuration of a motorcycle.

A schematic configuration of a motorcycle according to the present embodiment is described with reference to FIG. 1. FIG. 1 is a left side view illustrating the schematic configuration of the motorcycle. A driver is indicated as a dashed line D.

As shown in FIG. 1, a motorcycle 1 is an off-road type motorcycle in which an engine 3 is suspended (supported) by a vehicle body frame 2 made of steel or an aluminum alloy. The engine 3 is configured by, for example, a single cylinder engine. The vehicle body frame 2 and the engine 3 are described below.

A fuel tank 10 is arranged on an upper side of the engine 3. An outer cover 11 is attached to a front side of the fuel tank 10. A seat 12 extending rearward is provided on a rear side of the fuel tank 10.

A front fork 13 is rotatably supported, via a steering shaft (not shown), by a head pipe 20 (see FIG. 3) configuring a part of the vehicle body frame 2. A handle bar 14 is provided at an upper end of the steering shaft. A front wheel 15 is rotatably supported at a lower portion of the front fork 13. A front fender 16 is provided on the upper side of the front wheel 15.

A pivot portion 24 is formed by the vehicle body frame 2 on a rear lower side of the engine 3, and a swing arm 17 is coupled to the pivot portion 24 so as to be swingable in an upper-lower direction. The swing arm 17 extends rearward from the pivot portion 24, and a rear wheel 18 is rotatably supported at a rear end of the swing arm 17. A rear fender 19 extending from a rear end of the seat 12 is provided on the upper side of the rear wheel 18.

Further, an exhaust pipe 5 and a muffler 6 which serve as an exhaust system are connected to the engine 3. Specifically, the exhaust pipe 5 is connected to an exhaust port provided on a front surface of the engine 3 and extends rearward through a lateral side of the engine 3. A catalytic device 50 (see FIG. 2) is provided in the middle of the exhaust pipe 5. The muffler 6 is connected to a rear end of the exhaust pipe 5. A lateral side of the muffler 6 is covered by a side cover 60. The exhaust system will be described later.

Figure 2:
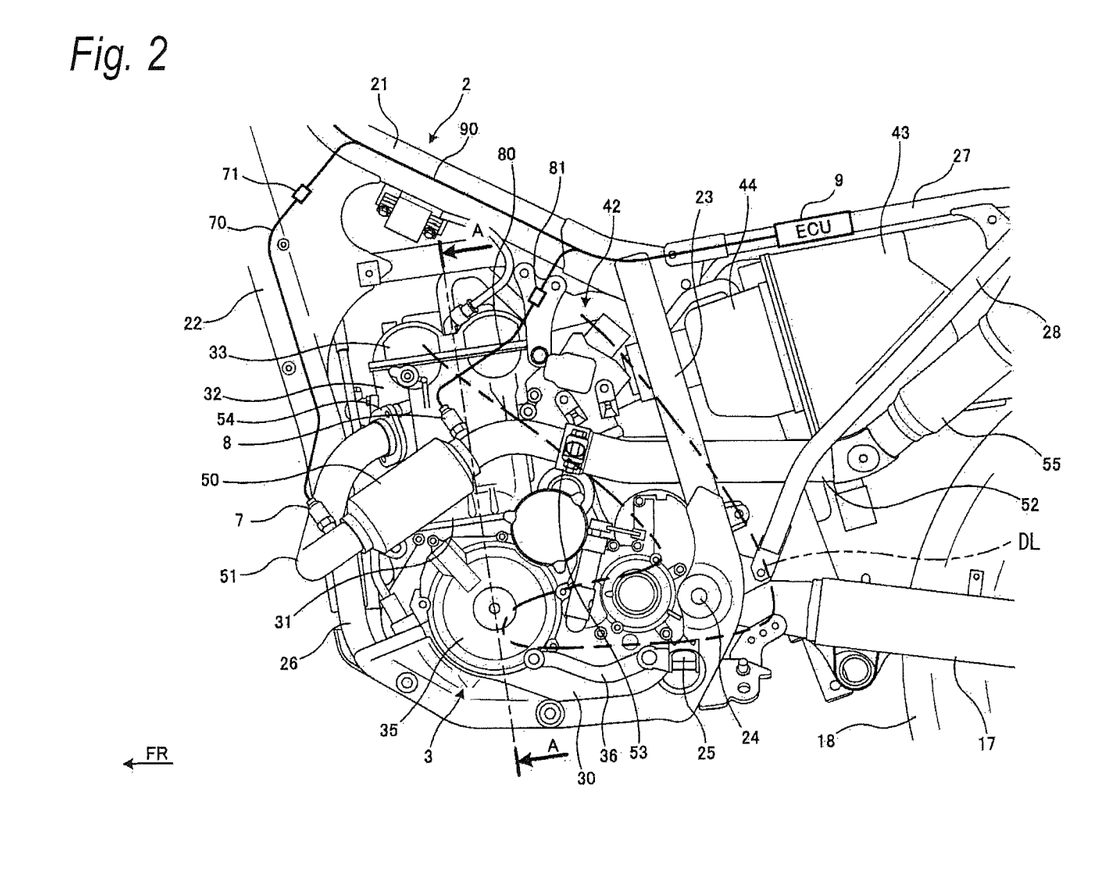
FIG. 2 is a partially enlarged view of the periphery of an engine of the motorcycle according to a present embodiment.
Figure 3:
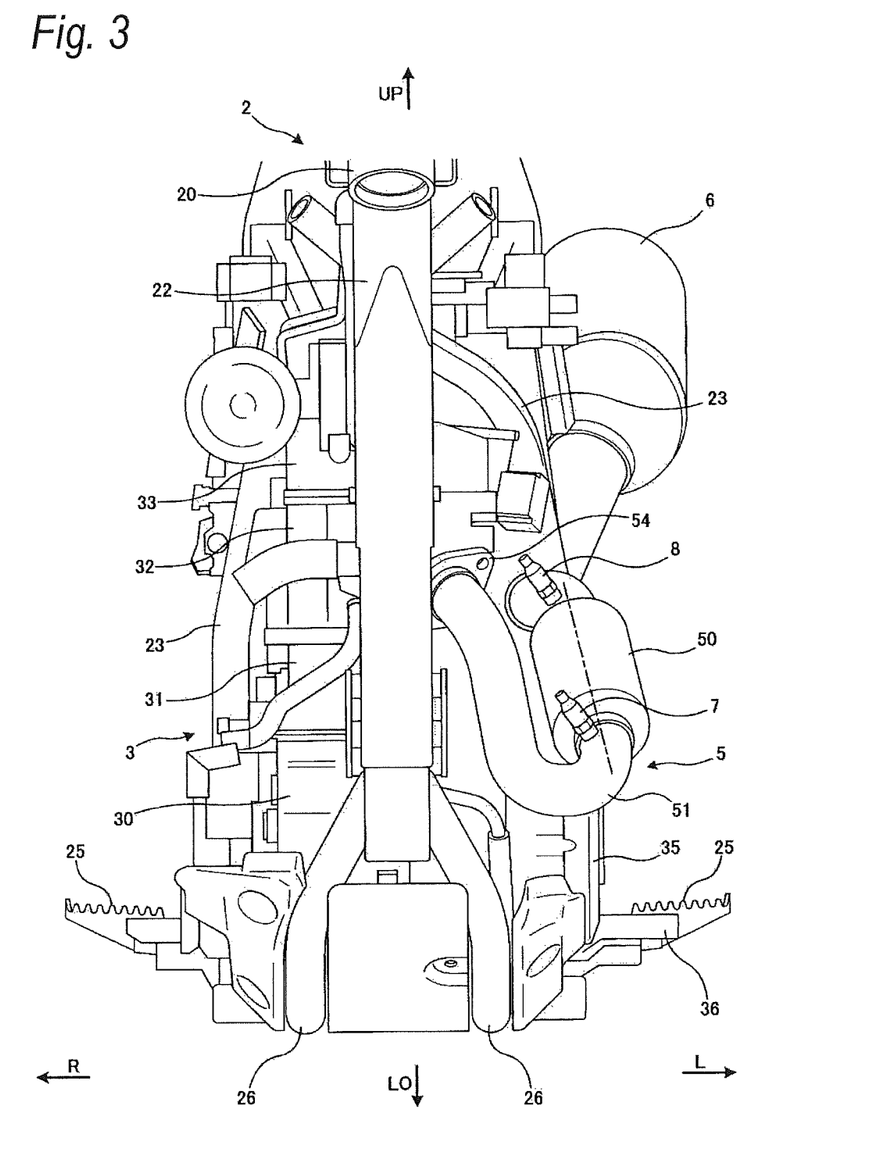
FIG. 3 is a front view of the engine and a vehicle body frame of the motorcycle according to the present embodiment.

Next, the configurations of the vehicle body frame and the engine are described with reference to FIG. 2 and FIG. 3. FIG. 2 is a partially enlarged view of the periphery of the engine of the motorcycle according to the present embodiment. FIG. 3 is a front view of the engine and the vehicle body frame of the motorcycle according to the present embodiment.

As shown in FIG. 2 and FIG. 3, the vehicle body frame 2 is configured by a cradle type frame, and is formed by welding a plurality of pipes or the like. Specifically, the vehicle body frame 2 includes the head pipe 20, a main frame 21 extending rearward and downward from an upper end of the head pipe 20, and a down frame 22 extending downward from a lower end portion of the head pipe 20. In FIG. 2, a leg of the driver is indicated by a dashed line DL.

The fuel tank 10 (see FIG. 1) is arranged on the main frame 21. A pair of body frames 23 branching to the right and left and extending downward separately is connected to a rear end portion of the main frame 21. The pivot portion 24 is formed in the body frame 23 at a portion slightly above a lower end. A pair of steps 25 on which feet of a driver are placed is provided on the lower side of the pivot portion 24. The steps 25 extend outward in a vehicle width direction.

The down frame 22 extends downward from the head pipe 20 through the front side of the engine 3. A pair of under frames 26 branching to the right and left and extending rearward separately is connected to a lower end portion of the down frame 22. The pair of under frames 26 is respectively connected to the lower end portions of the pair of body frames 23. The engine 3 is arranged in a space surrounded by the frames.

A pair of seat rails 27 extending rearward is connected to an upper end of the body frame 23. The seat 12 (see FIG. 1) is arranged on the seat rails 27. Further, a pair of rear frames 28 extending rearward and upward is connected to a lower end side (in the vicinity of pivot portion 24) of the body frame 23. A rear upper end of the rear frame 28 is connected to a rear portion of the seat rail 27 from below.

The engine 3 includes a crankcase 30, and a cylinder block 31, a cylinder head 32 and a cylinder head cover 33 which are attached at an upper portion of the crankcase 30 in order from the bottom. The crankcase 30 is configured by right and left split cases, and a crankshaft 34 (see FIG. 5) having a center axis in the vehicle width direction (left-right direction) is accommodated therein. Further, there are openings on left and right sides of the crankcase 30, and covers are attached to close the respective openings. Specifically, a magnet cover 35 is attached to the left side of the crankcase 30, and a clutch cover (not shown) is attached to the right side of the crankcase 30. Further, on the left side surface of the crankcase 30, a shift pedal 36 is provided with approximately the same height in the front side of the step 25.

Figure 5:
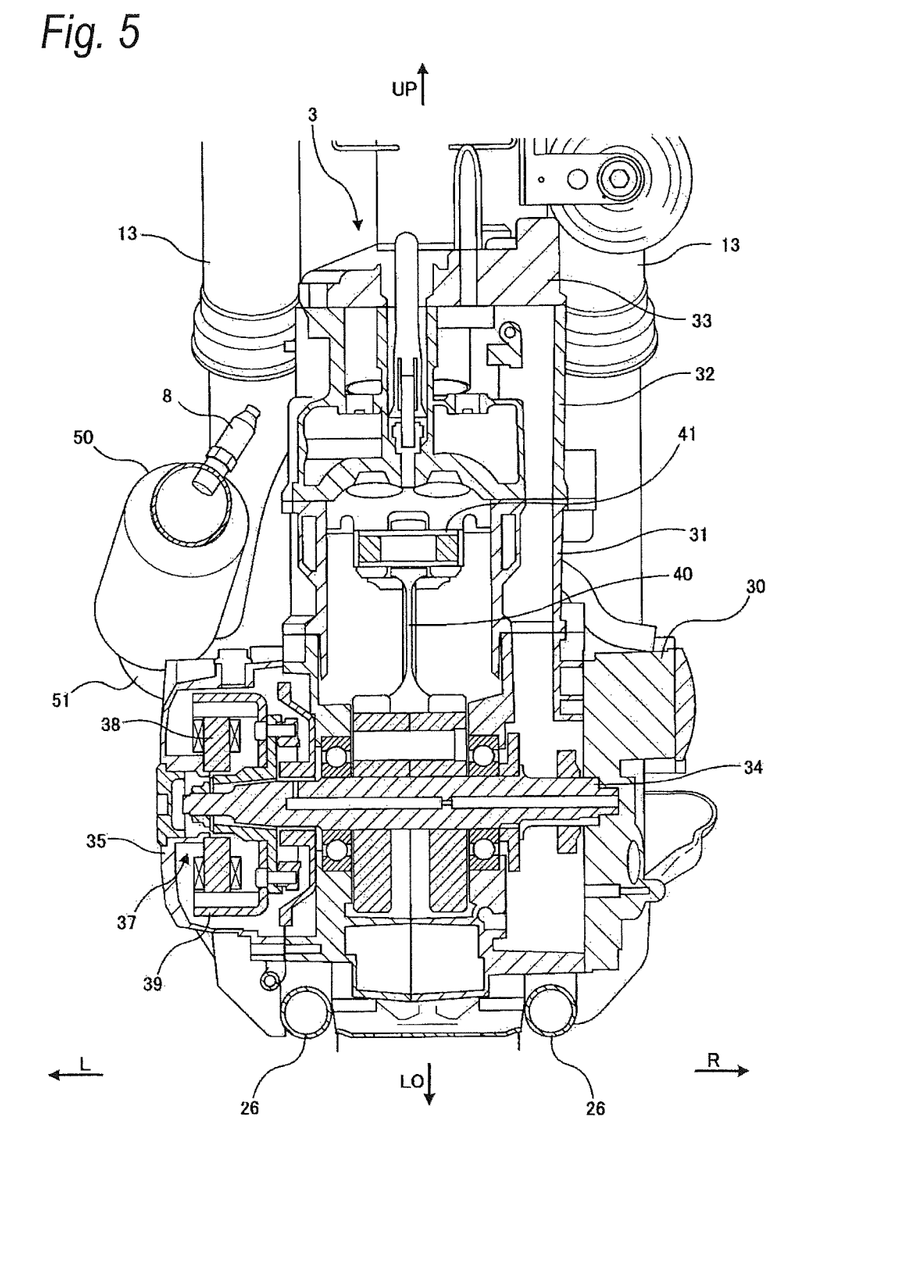
FIG. 5 is a cross sectional view taken along a line A-A in FIG. 2.

As will be described in detail later, a magnet 37 serving as a generator is provided on a left end side of the crankshaft 34 as shown in FIG. 5. The magnet 37 generates electric power by relative rotation of a magnet rotor 39 with respect to a stator 38 provided therein. Particularly, the engine 3 as a whole protrudes to the left side in the vehicle width direction by an amount corresponding to the magnet 37, and the magnet cover 35 is attached to the crankcase 30 so as to cover the magnet 37.

A piston 41 is connected to the crankshaft 34 via a connecting rod 40 (see FIG. 5). The piston 41 is accommodated in the cylinder block 31 so as to be able to reciprocate in the upper-lower direction. A valve mechanism (not shown) is accommodated in the cylinder head 32 and the cylinder head cover 33.

A throttle body 42 and an air cleaner 43 are arranged as intake system parts in an intake port (not shown) located on a back surface side of the engine 3. The throttle body 42 and the air cleaner 43 are connected by an outlet tube 44 configuring a clean side of intake air. In the side view, the throttle body 42 is arranged on the rear side of the cylinder head 32 in the front side of the body frame 23. In the side view, the air cleaner 43 and the outlet tube 44 are arranged in a space surrounded by the body frame 23, the seat rail 27, and the rear frame 28.

Next, the exhaust system according to the present embodiment will be described with reference to FIG. 2 to FIG. 4. FIG. 4 is a perspective view and a partial top view of the exhaust pipe according to the present embodiment.

As shown in FIGS. 2 to 4, the exhaust system according to the present embodiment includes the exhaust pipe 5 extending from the engine 3 and forming a part of an exhaust flow path, the catalytic device 50 for purifying exhaust gas flowing through the exhaust flow path, a first exhaust gas sensor 7 and a second exhaust gas sensor 8 for detecting predetermined components in the exhaust gas, an electronic control unit (ECU) 9 serving as a control device for performing deterioration diagnosis of the catalytic device 50, and the muffler 6 serving as a muffling device.

The exhaust pipe 5 is formed as a whole by bending and welding a metal pipe having a circular cross section. Further, the exhaust pipe 5 is led out from the front side of the engine 3 to one side in the left-right direction (left side in the present embodiment), and extends rearward so as to be routed on the lateral side of the engine 3. Specifically, the exhaust pipe 5 is configured such that a first pipe 51 connected to the exhaust port (not shown) of the engine 3 and a second pipe 52 to which the muffler 6 is connected are connected by a joint portion 53.

The exhaust port is formed on the front surface of the cylinder head 32 at a position deviating to the left side than the down frame 22 positioned substantially at the center in the vehicle width direction shown in FIG. 3. The first pipe 51 has a flange portion 54 at an upstream end, and is connected to the exhaust port through the flange portion 54. The first pipe 51 protrudes forward and downward from the exhaust port, is bent into a U shape in the front view and the top view on the lateral side of the down frame 22, and extends rearward and upward. Further, the first pipe 51 is slightly bent rearward and downward on the lateral side of the cylinder block 31 or the cylinder head 32.

The second pipe 52 is connected to a downstream end of the first pipe 51 via the cylindrical joint portion 53. As shown in FIG. 2, the second pipe 52 extends substantially horizontally toward the rear side and passes through the inside of the body frame 23 and the rear frame 28 on the rear side of the engine 3. Further, the second pipe 52 is slightly bent rearward and upward at the rear side of the rear frame 28. In the side view, the second pipe 52 is arranged on the lower side of the outlet tube 44 and the air cleaner 43 which are the intake system parts.

The muffler 6 is connected to a downstream end of the second pipe 52 via a straight pipe portion 55 extending rearward and upward by a predetermined length. The straight pipe portion 55 and the muffler 6 are positioned on the upper side of the rear wheel 18 as shown in FIG. 1.

Further, a front half portion of the straight pipe portion 55 and the muffler 6 is covered by the side cover 60 (see FIG. 1) at the lateral side.

The catalytic device 50 is arranged in the middle of the first pipe 51. Specifically, the catalytic device 50 is provided on the lateral side of the cylinder block 31 at a part of the first pipe 51 inclined upward toward the rear side. The catalytic device 50 is configured by a three-way catalyst, for example, and is configured by accommodating a columnar honeycomb portion (not shown) in a tubular outer tube whose diameter is larger than that of the first pipe 51. The catalytic device 50 adsorbs pollutants (carbon monoxide, hydrocarbons, nitrogen oxide or the like) in the exhaust gas and converts the pollutants into harmless substances (carbon dioxide, water, nitrogen or the like).

The first exhaust gas sensor 7 for detecting a predetermined component in the exhaust gas is arranged in the first pipe 51 located on the upstream side of the catalytic device 50. The first exhaust gas sensor 7 is arranged on the rear side of the foremost part of the first pipe 51 in the side view. More specifically, the first exhaust gas sensor 7 is arranged to overlap the down frame 22 in the side view.

Further, The second exhaust gas sensor 8 for detecting a predetermined component in the exhaust gas is arranged in the first pipe 51 located on the downstream side of the catalytic device 50. That is, the second exhaust gas sensor 8 is arranged so as to sandwich the catalytic device 50 with the first exhaust gas sensor 7 in the side view. In addition, the second exhaust gas sensor 8 is arranged to overlap the cylinder block 31 or the cylinder head 32 in a side view.

The exhaust gas sensor 7 and the second exhaust gas sensor 8 (hereinafter simply referred to as an exhaust gas sensor) are configured by, for example, a zirconia type oxygen sensor, and output (current value) thereof changes in accordance with oxygen concentration in the exhaust gas. The current value is output to the ECU 9. The exhaust gas sensors 7 and 8 are not limited to oxygen sensors, but may also be, for example, air-fuel ratio sensors.

The exhaust gas sensors 7 and 8 are formed in a columnar shape with a predetermined length, one end thereof serves as a detection portion (see FIG. 4), and the other end connects with harnesses 70 and 80. The exhaust gas sensors 7 and 8 penetrate through the first pipe 51 on the front side and rear side of the catalytic device 50 and are arranged so that the detection portion protrudes into the exhaust flow path.

Further, the exhaust gas sensors 7 and 8 are arranged such that the one end is directed downward, the other end is directed upward, and the other end side is inclined forward and to the inner side of the engine 3. More specifically, the exhaust gas sensors 7 and 8 are arranged such that the detection portion (the one end) is directed to the center axis of the exhaust flow path and the other end is located on the inner side (inner side of the vehicle) of the engine 3 than the axis center of the catalytic device 50.

The ECU 9 totally controls various operations in the motorcycle 1. The ECU 9 includes a processor, a memory or the like for executing various processes in the motorcycle 1. The memory is configured by a storage medium such as a read only memory (ROM), or a random access memory (RAM) according to a use thereof. The memory stores, for example, a control program for controlling each part of the motorcycle 1. Particularly, in the present embodiment, the ECU 9 performs deterioration diagnosis on the catalytic device 50 by using detection results of the exhaust gas sensors 7 and 8.

Further, the ECU 9 is arranged on the upper side of the air cleaner 43 in a space between the pair of seat rails 27. A main harness 90 connected to the ECU 9 is routed along the main frame 21. The harness 70 of the first exhaust gas sensor 7 is arranged along the down frame 22 and connected to the main harness 90 via a connector 71. The harness 80 of the second exhaust gas sensor 8 is arranged through the lateral side of cylinder head 32 and the cylinder head cover 33, and connected to the main harness 90 via a connector 81.

As described above, in the exhaust system of a vehicle engine, it is required to monitor the deterioration state of the catalyst as an exhaust gas purification device in accordance with recent exhaust gas regulation. In order to determine the deterioration of the catalyst, it is necessary to provide exhaust gas sensors upstream and downstream of the catalyst.

For example, it has been practiced to detect the oxygen concentration in the exhaust gas by an exhaust gas sensor (oxygen sensor) provided on the upstream side of the catalyst so as to control the air-fuel ratio. However, when the exhaust gas sensor is also arranged on the downstream side of the catalyst for the purpose of determining the deterioration of the catalyst, it is difficult to arrange the exhaust gas sensor while ensuring the predetermined detection accuracy due to limitation of the layout peculiar to the motorcycle.

In an off-road type motorcycle, for the purpose of improving the output, a large-capacity expansion chamber is provided on the front side of the engine. In this case, it may be difficult to ensure the arrangement location of the catalyst and the exhaust gas sensor as described above. In the off-road type motorcycle, restrictions exist in the space on the front side of the engine from the viewpoint of ensuring the stroke of the front fork and the clearance between the front wheel (including the front fender) and the front side of the engine.

Therefore, the inventor of the present invention focused on the route of the exhaust pipe, the positional relationship between the catalytic device, the exhaust gas sensor and the driver, and then conceived the present invention. Specifically, in the present embodiment, the exhaust pipe 5 is led out from the front side of the engine 3 to one side in the left-right direction, and is routed to pass through the lateral side of the engine 3 and extend rearward. Further, the catalytic device 50 is arranged in the middle of the exhaust pipe 5 on the lateral side of the engine 3, and the first exhaust gas sensor 7 and the second exhaust gas sensor 8 are arranged on the front side and rear side of the catalytic device 50.

For example, in a case where the catalytic device 50 is arrange on the front side of the engine 3, the front wheel 15 (see FIG. 1) must be moved forward so as to ensure a clearance with the front wheel 15, which is a factor of increasing the overall length of the vehicle. However, according to the above configuration, the catalytic device 50 is arranged on the lateral side of the engine 3, so that the clearance with the front wheel 15 can be sufficiently ensured, and it is not necessary to move the front wheel 15 forward. As a result, the overall length of the vehicle can be shortened, and the mobility can be improved.

Further, in a case where the catalytic device 50 is arranged on the lower side of the engine 3, the minimum ground clearance of the vehicle is lowered, and there is a fear that the catalytic device 50 may be grounded in off-road traveling. However, in the present embodiment, the catalytic device 50 is arranged as described above, so that the minimum ground clearance of the vehicle is raised, and the catalytic device 50 can be prevented from being grounded in the off-road traveling.

Further, the first exhaust gas sensor 7 and the second exhaust gas sensor 8 are respectively arranged on the upstream side and downstream side of the catalytic device 50 to sandwich the catalytic device 50 from the front side and the rear side, so that a predetermined component in the exhaust gas flowing on the upstream side and the downstream side of the catalytic device 50 can be appropriately detected, and the deterioration diagnosis of the catalytic device 50 can be performed. That is, the exhaust gas sensors 7 and 8 can be arranged without impairing the detection accuracy of exhaust gas components.

The exhaust port of the cylinder head 32 is biased toward the left or right side of the down frame 22, and the exhaust pipe 5 (first pipe 51) is bent on the front side of the engine 3 from the exhaust port. The catalytic device 50 is connected to the first pipe 51 immediately after the bending, so that the length of the exhaust pipe from the exhaust port to the catalytic device 50 can be shortened. As a result, the catalytic device 50 can be activated immediately after the start of the engine 3, and the exhaust gas purification performance can be enhanced.

As shown in FIG. 5, the first pipe 51 is routed to a magnet side which is the left side of the vehicle, and the catalytic device 50 is arranged on the upper side of the magnet 37. As described above, since the magnet 37 protrudes to the left side of the engine 3, a predetermined space is formed on the lateral side of the cylinder head 32 above the magnet 37. In the present embodiment, the catalytic device 50 is arranged in the predetermined space above the magnet 37, so that the space can be effectively used. Particularly, the catalytic device 50 can be arranged close to the center side of the vehicle, and the lateral width of the vehicle can be reduced. Further, since the catalytic device 50 is a relatively heavy object, by being placed close to the center side of the vehicle, the mass is concentrated and the mobility of the vehicle can be increased.

As shown in FIG. 2, the first exhaust gas sensor 7 is arranged on the rear side of the foremost part of the first pipe 51 in the side view. According to the configuration, the first pipe 51 is positioned on a front and lower side of the first exhaust gas sensor 7, so that the first pipe 51 plays a role of guard. Specifically, the first exhaust gas sensor 7 can be protected by the first pipe 51 from pebbles or the like wound by the front wheel 15.

Further, the first exhaust gas sensor 7 is arranged to overlap the down frame 22 in the side view. According to the configuration, the harness 70 of the first exhaust gas sensor 7 can be arranged along the down frame 22. For example, as shown in FIG. 2, the harness 70 is arranged to extend upward along the down frame 22 from the first exhaust gas sensor 7. Further, the harness 70 is connected to the main harness 90 arranged along the main frame 21 via the connector 71.

The second exhaust gas sensor 8 is arranged to overlap with the cylinder head 32 in the side view. The harness 80 of the second exhaust gas sensor 8 passes through the lateral side of the engine 3, is routed rearward and upward, and is connected to the main harness 90 via the connector 81. In this way, by optimizing the route of various harnesses, the length of each harness can be shortened.

The catalytic device 50 and the exhaust gas sensors 7 and 8 are arranged in a front half portion (for example, the front side of the center of a crankshaft 34) of the engine 3 in the side view, and the other ends of the exhaust gas sensors 7 and 8 are arranged to incline forward and to the inner side of the engine 3. More specifically, the exhaust gas sensors 7 and 8 are arranged such that the detection portion (the one end) is directed to the center axis of the exhaust flow path and the other end is located on the inner side (inner side of the vehicle) of the engine 3 than the axis center of the catalytic device 50.

Further, in a rear half portion of the engine 3, the second pipe 52 passes through the upper side of the step 25 and extends rearward, so that a foot of a driver passes to straddle the lateral side of the second pipe 52 vertically. That is, in the present embodiment, the catalytic device 50 which is a heat source is arranged away from the foot of the driver. Therefore, thermal damage received from the catalytic device 50 can be suppressed as much as possible. Further, by directing the other ends of the exhaust gas sensors 7 and 8 in a direction away from the driver, the exhaust gas sensors 7 and 8 can be prevented from contacting leg portions of the driver. In addition, it is possible to increase the degree of freedom on the posture of the driver.

Further, the two exhaust gas sensors 7 and 8 are arranged to be parallel with each other. According to the configuration, the attachment configuration of a sensor with respect to the first pipe 51 can be commonly used, so that the number of steps in the manufacturing and assembly work can be reduced.

As described above, in the present embodiment, the exhaust pipe 5 is routed in the lateral side of the engine 3, the catalytic device 50 is arranged in the middle of the exhaust pipe 5, and the exhaust gas sensors 7 and 8 are arranged on the front side and rear side of the catalytic device 50. According to the configuration, the exhaust gas sensors 7 and 8 can be arranged without impairing the detection accuracy of the exhaust gas components and not being restricted by the peripheral configuration of the vehicle.

In the above embodiment, the single cylinder engine 3 is described as an example, but the present invention is not limited thereto. For example, the engine 3 may be configured by a multi-cylinder engine having two or more cylinders, and arrangements of the cylinders may be appropriately changed.

Further, in the above embodiment, the exhaust pipe 5 is arranged to route to the left side of the engine 3, but the configuration is not limited thereto. The exhaust pipe 5 may be routed to the right side of the engine 3.

Further, in the above embodiment, the exhaust port is arranged to bias toward the left side with respect to the down frame 22, but the present invention is not limited thereto. The exhaust port may be arranged to bias toward the right side with respect to the down frame 22.

Further, in the above embodiment, the magnet 37 is arranged on the left end side of the crankshaft 34, but the present invention is not limited thereto. The magnet 37 may be arranged on the right end side of the crankshaft 34.

Further, in the above embodiment, the first exhaust gas sensor 7 and the second exhaust gas sensor 8 are respectively arranged on the upstream side and downstream side of the catalytic device 50, but the present invention is not limited thereto. The exhaust gas sensors may be arranged only on one side of the upstream side and the downstream side of the catalytic device 50. Further, the first exhaust gas sensor 7 is arranged on the upstream side of the catalytic device 50, but the first exhaust gas sensor 7 may also be arranged on the downstream side of the catalytic device 50.

Further, in the above embodiment, the second exhaust gas sensor 8 is arranged to overlap the engine 3 in the side view, but the present invention is not limited thereto. The first exhaust gas sensor 7 may also be arranged to overlap the engine 3 in the side view.

Further, in the above embodiment, the other ends of the exhaust gas sensors 7 and 8 are arranged to incline forward and to the inner side of the engine 3, but the present invention is not limited thereto. The other end of the first exhaust gas sensor 7 positioned relatively away from the leg portion of the driver may be directed to another direction.

Figure 6:
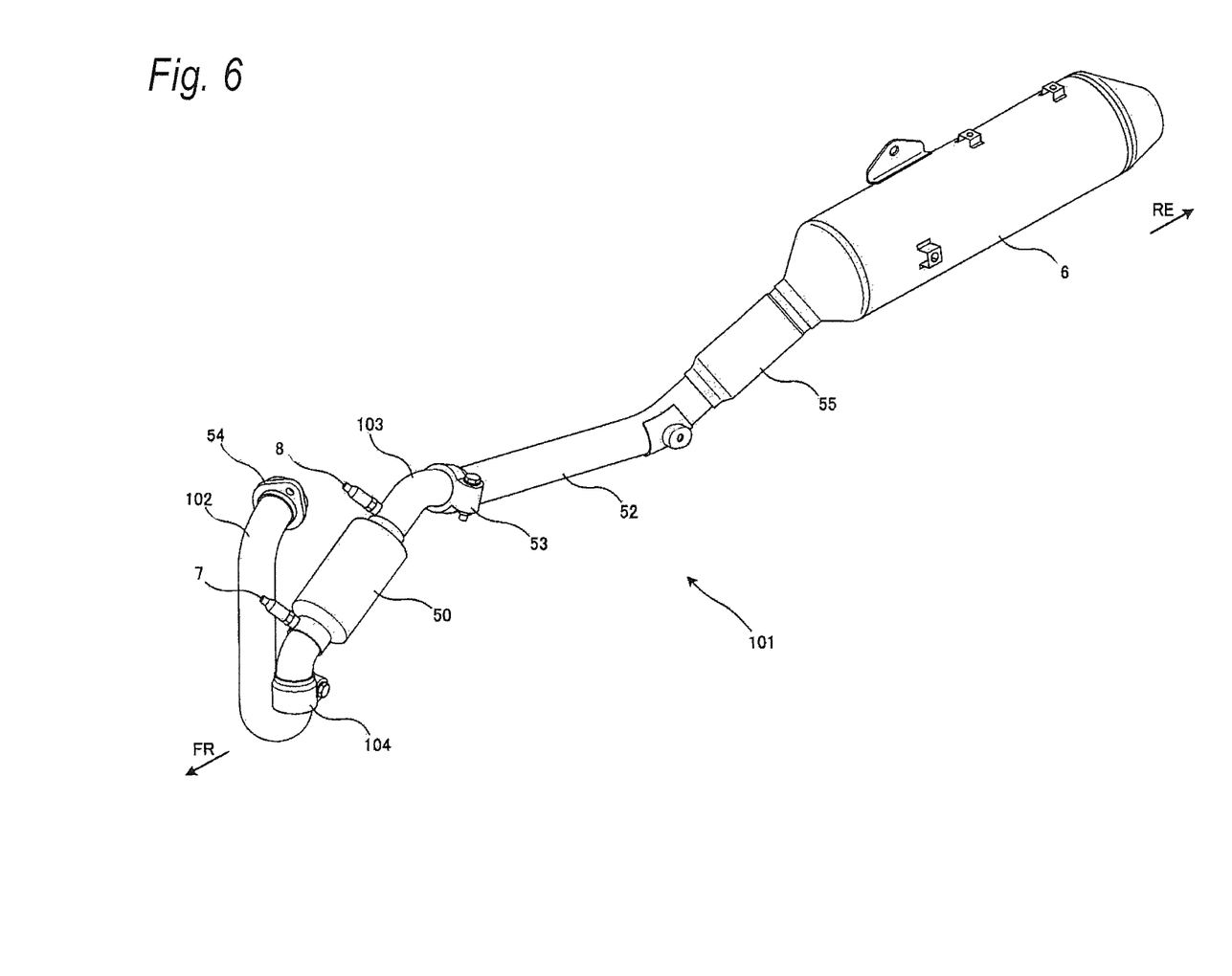
FIG. 6 is a perspective view of an exhaust pipe according to a modification.

Further, in the above embodiment, the first pipe 51 and the second pipe 52 arranged to connect by the joint portion 53 on the downstream side of the catalytic device 50, but the present invention is not limited thereto. For example, the configuration shown in FIG. 6 may also be possible. FIG. 6 is a perspective view of an exhaust pipe according to a modification. In FIG. 6, a pipe corresponding to the first pipe 51 in FIG. 4 is divided into two parts on the upstream side of the catalytic device 50, which is different from the configuration in FIG. 4. The differences will be mainly described below.

As shown in FIG. 6, an exhaust pipe 101 according to the modification includes a first pipe 102 that is connected to an exhaust port, a first pipe 103 that is connected to the first pipe 102 via a joint portion 104 and is provided with a catalytic device 50 in the middle thereof, and a second pipe 52 that is connected to the first pipe 103 via a joint portion 53. The second pipe 52 and the joint portion 53 have the same configuration as in FIG. 4, and the description thereof is omitted.

The first pipe 102 protrudes forward and downward from the exhaust port and extends downward in the vertical direction along the down frame 22 (see FIG. 2). The first pipe 102 turns to the left side at a lower end portion and reverses by 180 degrees and slightly protrudes upward, and the first pipe 103 is connected to the protruded portion via the joint portion 104. The first pipe 103 is inclined upward toward the rear side on the lateral side of the engine 3. The catalytic device 50 is provided in the middle of the first pipe 103, and exhaust gas sensors 7 and 8 are arranged on the upstream side and the downstream side of the catalytic device 50.

In the modification, the joint portion 104 is provided on the upstream side of the first exhaust gas sensor 7, and the joint portion 53 is provided on the downstream side of the second exhaust gas sensor 8. According to this configuration, the catalytic device 50 and the two exhaust gas sensors 7 and 8 can be assembled in advance to the first pipe 103. That is, the catalytic device 50 and the exhaust gas sensors 7 and 8 can be sub-assembled into the first pipe 103. Therefore, it is possible to improve assembling workability of the catalytic device 50 and the exhaust gas sensors 7 and 8, as compared with the case where the exhaust pipe 101 as a whole is assembled to the engine 3 at the same time.

Although the present embodiment and the modification have been described, the present embodiment and the modification may be combined in whole or in part as another embodiment of the present invention.

Further, embodiments of the present invention are not limited to the above embodiment, and changes, substitutions and alterations may be made without departing from the spirit of the technical concept of the present invention. Further, the present invention may be implemented by use of other methods as long as the technical concept of the present invention can be implemented by the methods through advance of technology or other derivative technology. Therefore, the scope of the claims covers all embodiments that may fall within the scope of the technical concept.

As described above, the present invention has an effect that the exhaust gas sensor can be arranged without impairing the detection accuracy of the exhaust gas components, and is particularly useful for an off-road type motorcycle.

What is claimed is:

1. An arrangement structure of an exhaust gas sensor, comprising:
    an exhaust pipe that extends from an engine for a vehicle to form a part of an exhaust flow path;
    a catalytic device that purifies exhaust gas flowing through the exhaust flow path; and
    a first exhaust gas sensor that detects a predetermined component in the exhaust gas,
    wherein the exhaust pipe is led out from a front side of the engine to one side in a left-right direction of the engine, and extends rearward so as to be routed on a lateral side of the engine,
    wherein the catalytic device is arranged in the middle of the exhaust pipe on the lateral side of the engine, and
    wherein the first exhaust gas sensor is arranged on the lateral side of the engine and on an upstream side or a downstream side of the catalytic device in the exhaust pipe, and
    wherein the first exhaust gas sensor and a whole part of the catalytic device are arranged on an upper position than a crankshaft of the engine.

2. The arrangement structure of an exhaust gas sensor according to claim 1,
    wherein the first exhaust gas sensor is arranged on a rear side than a foremost part of the exhaust pipe in a side view.

3. The arrangement structure of an exhaust gas sensor according to claim 1, further comprising:
    a second exhaust gas sensor that detects a predetermined component in the exhaust gas,
    wherein the catalytic device is disposed between the first exhaust gas sensor and the second exhaust gas sensor in the side view.

4. The arrangement structure of an exhaust gas sensor according to claim 3,
    wherein the first exhaust gas sensor is arranged on a front side of the engine and the second exhaust gas sensor overlaps a cylinder head of the engine in the side view.

5. The arrangement structure of an exhaust gas sensor according to claim 3,
    wherein at least one of the first exhaust gas sensor and the second exhaust gas sensor is inclined forward.

6. The arrangement structure of an exhaust gas sensor according to claim 3,
    wherein at least one of the first exhaust gas sensor and the second exhaust gas sensor is inclined to an inner side of the engine.

7. The arrangement structure of an exhaust gas sensor according to claim 3,
    wherein each of the first exhaust gas sensor and the second exhaust gas sensor includes a detection portion on one end thereof protruding into the exhaust flow path, and
    the other end of each the first exhaust gas sensor and the second exhaust gas sensor is positioned on the inner side of the engine than an axis center of the catalytic device.

8. The arrangement structure of an exhaust gas sensor according to claim 3,
    wherein the first exhaust gas sensor is provided on the upstream side of the catalytic device, and the second exhaust gas sensor is provided on the downstream side of the catalytic device, and wherein a joint portion is provided in the exhaust pipe on the downstream side of the second exhaust gas sensor.

9. The arrangement structure of an exhaust gas sensor according to claim 3,
wherein the first exhaust gas sensor is provided on the upstream side of the catalytic device, and the second exhaust gas sensor is provided on the downstream side of the catalytic device, and
wherein joint portions are respectively provided in the exhaust pipe on the upstream side of the first exhaust gas sensor and in the exhaust pipe on the downstream side of the second exhaust gas sensor.

10. The arrangement structure of an exhaust gas sensor according to claim 1, further comprising:
a vehicle body frame that supports the engine,
wherein the vehicle body frame has a down frame that extends downward from a head pipe through the front side of the engine,
wherein the first exhaust gas sensor overlaps the down frame in the side view, and
wherein the catalytic device is arranged between a front end of the down frame and the crankshaft, in the side view.

11. The arrangement structure of an exhaust gas sensor according to claim 1, further comprising:
a magnet that is provided on one end of a crankshaft having a center axis in the left-right direction of the engine,
wherein the exhaust pipe is routed to a magnet side, and
wherein the catalytic device is arranged on an upper side of the magnet and overlaps a cylinder head of the engine in a side view.

12. The arrangement structure of an exhaust gas sensor according to claim 1, further comprising:
a step on which a foot of a driver is placed on a lower side of the engine,
wherein the exhaust pipe extends rearward through an upper side of the step.

13. The arrangement structure of an exhaust gas sensor according to claim 10,
wherein the engine is a single cylinder engine, and
wherein an exhaust port of the engine is arranged to bias toward one side in the left-right direction with respect to the down frame in a front view.

* * * * *